L. W. CHUBB.
SYSTEM OF WATER DISTRIBUTION.
APPLICATION FILED DEC. 10, 1914.
1,247,374.
Patented Nov. 20, 1917.
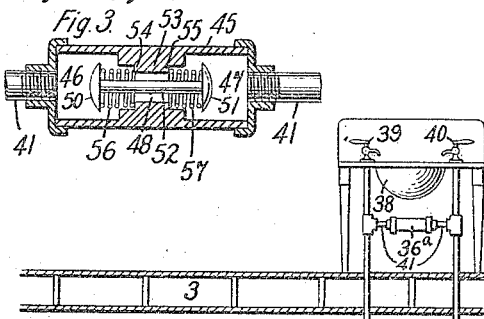
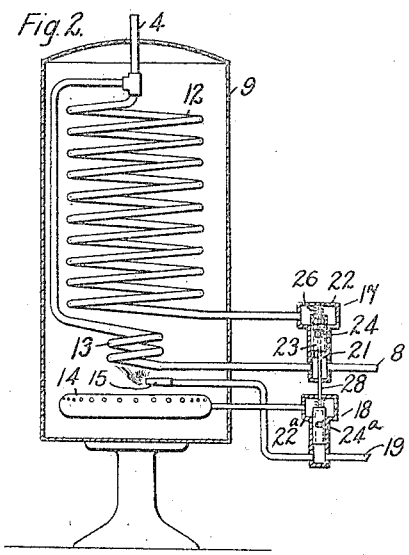
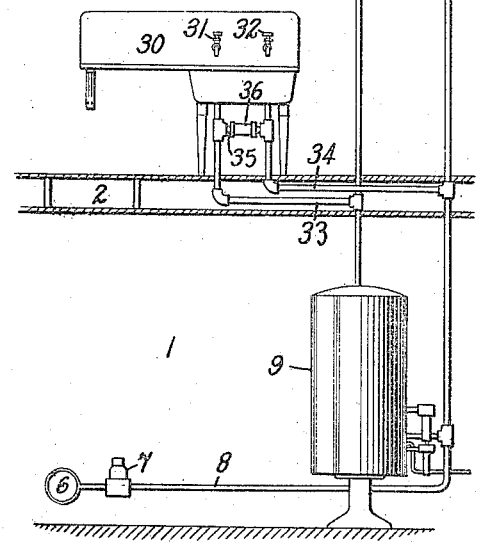
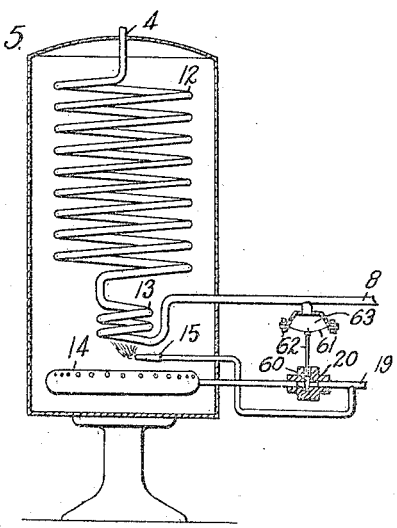
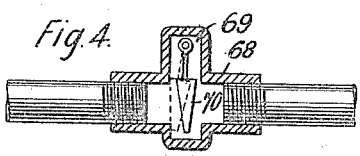
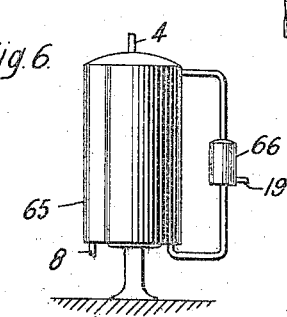
WITNESSES:
Fred H. Miller
W. R. Coley
INVENTOR
Lewis W. Chubb
BY
Donald H. Mace
ATTORNEY

UNITED STATES PATENT OFFICE.

LEWIS W. CHUBB, OF EDGEWOOD PARK, PENNSYLVANIA.

SYSTEM OF WATER DISTRIBUTION.

1,247,374.

Specification of Letters Patent.

Patented Nov. 20, 1917.

Application filed December 10, 1914. Serial No. 876,395.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Systems of Water Distribution, of which the following is a specification.

My invention relates to systems of water distribution for dwelling houses and other buildings, with particular reference to independent systems of hot water and cold water distribution and to means for obviating the freezing of water in such systems during periods of cold weather.

One of the objects of my invention is to provide a system of distribution of the character indicated which shall be simple and inexpensive in arrangement and construction, effective and reliable in operation, and which shall be especially adapted to accomplish the desired results without necessitating any manipulation, adjustments or inconvenience of any sort to the occupants of the building, or interfering in any way with the normal operation of the distributing systems.

Another object of my invention is to provide means for interconnecting hot water and cold water systems of the type mentioned in such manner that under normal conditions a thermal circulation of water is effected throughout the entire combined system, whereby the freezing of water is prevented and hot water is always immediately available at the hot water faucets. Moreover, it is a further object to provide means for automatically cutting off the circulation and isolating the respective systems, in order to prevent a mixture of hot and cold water in the event that water is drawn from either of the systems, and in order that the systems shall at all times be capable of furnishing hot or cold water as desired.

It is a still further object of my invention to provide such a system of water distribution as has been set forth, which shall be adapted for successful operation in connection with heating apparatus of the "instantaneous" type, and incidentally to improve the construction and operation of "instantaneous" heaters and to make provisions whereby heaters of this character shall be adapted to continuously supply a small amount of heat to at least a portion of the water traversing them in order that a continuous circulation is rendered possible.

In Patent 1,108,550, filed January 15, 1913, and granted August 25, 1914, to me, I have disclosed a system of this general character, but, in employing this particular system, it is incumbent upon the occupants of the house to manipulate certain valves which are located in remote parts of the house in order to permit of the water circulation, and also to restore the normal water distribution.

Furthermore, this prior system is inoperative with any form of "instantaneous" heater with which I am familiar, by reason of the lack of a continuous supply of heat that is requisite for the thermal circulation.

According to my present invention, I provide an automatic double acting valve in the pipe, or pipes, which interconnects the respective systems, and the construction of this valve is such that while it permits a slow thermal circulation, it is adapted to automatically close, in the one direction or the other, whenever a predetermined rapid flow of water through it is effected by reason of drawing off water from any faucet or other outlet associated with either system. Thus, when water is drawn, the systems are completely separated and hot or cold water is obtained, as the case may be. There can be no mixture of the water which would result in a flow of tepid water, irrespective of the particular system from which it is delivered.

My improved system is not only adapted to obviate the difficulties and secure the beneficial results hereinbefore mentioned, but it also permits at relatively small expense the attainment of the advantage of the instantaneous supply of hot water that is secured in continuously circulating hot water systems with which many homes and other buildings are equipped. Moreover, this desirable feature is secured with the entailment of minimum expense, as the necessary piping and fittings are materially less than those required for houses in which continuously circulating hot water systems are installed.

My invention is illustrated in the accompanying drawing of which Figure 1 is a diagrammatic view of a portion of a dwelling house, or other building, provided with a system of water distribution embodying my invention: Fig. 2 is a diagrammatic view of the heating apparatus shown in Fig. 1; Fig. 3 is an enlarged view, partially in section and partially in elevation, of an automatic valve shown in Fig. 1; Fig. 4 is a similar view of a modified form of valve; Fig. 5 is a diagrammatic view of a modified form of heating apparatus, and Fig. 6 is a view in elevation of a further modification of a heating device which may be employed in connection with my invention.

Referring to the drawing, a dwelling house, or similar structure, having a cellar or basement 1 and a plurality of floors 2 and 3, is provided with a hot water system 4 and a cold water system 5 which receive their supply of water from a common source or main 6 through a meter 7 and a feed pipe 8.

Associated with the hot water system 4 is a heating apparatus 9 which, in the broadest aspect of my invention, may constitute any form of apparatus for continuously heating at least a portion of the water in the system 4. For illustrative purposes, I have shown the heating apparatus 9 as embodying a type of so-called "instantaneous" heater in which the supply of water is cut off at all times when water is not being drawn from the system.

For a detailed description of the apparatus 9, reference may be had to Fig. 2 in which is shown an "instantaneous" heater comprising a main water coil 12, an auxiliary water coil 13, a main gas burner 14 for heating the main coil 12, and an auxiliary pilot light or burner 15 which is lighted at all times and serves both to ignite the main burner 14 and to continuously impart heat to the water contained within the auxiliary water coil 13. The auxiliary water coil 13 is connected in multiple relation around the main water coil 12. The supply of water to the main coil 12 is received from the common feed pipe 8 through an automatic valve 17 which is mechanically associated with a similar valve 18 that serves to govern the admission of gas from a supply pipe 19 to the main burner 14.

The automatic water valve 17 comprises a tubular casing 21 having an enlarged upper chamber 22. Within the casing 21 is disposed a movable valve 23 in the form of a hollow cylinder which is closed at its upper end and is provided with a side opening or port 24 adjacent thereto. The movable valve 23 is adapted to be raised and lowered within the tubular casing 21 for the purpose of uncovering and covering the port 24. A spring 26 is employed for maintaining said valve in its lowest or closed position, as shown.

The main water coil 12 communicates with the enlarged upper chamber 22 and receives water from the supply pipe 8 whenever the movable valve 23 is raised in position. The auxiliary water coil 13 is connected to the lower end of the tubular casing 21 and, therefore, is in communication with the supply or feed pipe 8 at all times. When no water is being drawn from the hot water system 4 through the water coil 12, the pressure on the opposite sides of the movable valve 23 is balanced, and, hence, said valve is held closed. However, if water is drawn from the system, the pressure on the upper end of the valve 23 is relieved, and the resulting unbalanced pressures cause said valve to be raised to uncover the port 24 and to permit the supply of water to the system 4.

The gas valve 18 is similar in general construction to the water valve 17, except that it is mechanically associated therewith by means of a stem 28 and is actuated thereby. The main burner 14 communicates with the upper end $22^a$ of the valve 18 and receives a supply of gas only when said valve occupies its raised position, in which a port $24^a$ is uncovered and opened. The auxiliary burner or pilot light 15 is associated with the lower end of the casing $22^a$ and is continuously supplied with gas.

Under normal conditions of operation when no water is drawn from the system, the valves 17 and 18 are both closed and the pilot light 15 is permitted to burn continuously to supply a small portion of heat to the water contained in and passing through the auxiliary water coil 13. Thus, the water of the system 4 is heated at a slow rate and a continuous thermal circulation thereof is effected, as will be hereinafter more fully set forth. When the automatic water valve 17 is opened by reason of the drawing of water from the system, it actuates the gas valve 18 into its open position to permit the supply of gas to the main burner 14, which gas is immediately ignited by the constantly burning pilot light 15 and thereafter serves to supply heat to the water contained within and traversing through the main water coil 12. Obviously, any other types of water and gas valves to accomplish the same results may be used.

Again referring to Fig. 1, a sink 30 having a hot water faucet 31 and a cold water faucet 32, is located on the floor 2 of the house, and said faucets are respectively connected to the hot water system 4 and cold water system 5 by means of branch pipes 33 and 34, which are interconnected beneath the faucets 31 and 32 by means of a pipe 35 and an automatic valve 36, which will be hereinafter described.

A wash bowl 38 is located upon the floor 3 and is provided with hot water and cold water faucets 39 and 40 that respectively terminate the hot water system 4 and cold water system 5 in accordance with customary practice. A pipe 41 containing an automatic valve 36ª is connected between the systems 4 and 5 below the faucets 39 and 40.

The automatic valves 36 and 36ª are of like construction and each comprises a casing 45 having a plurality of enlarged chambers 46 and 47 that are connected by a passage 48. The several chambers 46 and 47 are connected to portions of the interconnecting pipe 41. Movable valve members 50 and 51 are disposed within the respective chambers 46 and 47 and are mechanically associated by means of a rod or stem 52. A central portion 53 of the casing 45 which is interposed between the chambers 46 and 47 and which is provided with the passage 48 is also provided with shoulders 54 and 55. Seated upon the shoulders 54 and 55 and surrounding the stem or rod 52 are a plurality of springs 56 and 57 that respectively engage the respective valve members 50 and 51 and serve to maintain said members in a central position, as shown in Fig. 3. In this position, communication is permitted between the chambers 46 and 47 through the passage 48 and, therefore, a flow of fluid therethrough may be established as long as the rate of flow is insufficient to actuate the connected valve members 50 and 51 in one direction or the other to close the passage 48. If the rate of flow exceeds that for which the springs 56 and 57 are adapted, it is clear that the connected valve members 50 and 51 are moved to effect the closure of the passage.

Referring again to Fig. 1 and assuming the parts of the apparatus to occupy the positions shown, the operation of the system is as follows: Heat is continuously and slowly imparted to the water within the auxiliary water coil 13 of the heater 9, and, by reason thereof, a thermal circulation is continuously effected throughout the entire combined systems 4 and 5 whereby the water is prevented from freezing and hot water is quickly available. If, under these conditions, the faucet 39 is opened to draw hot water from the system, the pressure on the adjacent side of the automatic valve 36ª is reduced and the resulting rapid flow of water from the cold water system 5 through said valve immediately effects its closure. Therefore, the supply of cold water is cut off and hot water is at once delivered from the faucet 39. Inasmuch as a description of the operation of the "instantaneous" heater 9 has already been given, no further exposition thereof is deemed necessary.

As soon as the faucet 39 is again closed, balanced pressures are obtained on the opposite sides of the valve 36ª and, therefore, the springs 56 and 57 return the associated valve members 50 and 51 to their normal central position, thereby permitting the slight thermal circulation to be resumed.

It is evident, therefore, a continual circulation of water through the entire system is effected which prevents freezing, and, that the respective hot water and cold water systems 4 and 5 are isolated whenever water is drawn from either system.

In certain instances it may be desirable to employ a modified form of heater of the "instantaneous" type in which the supply of water is never cut off. Such a heater is illustrated in Fig. 5 to which reference may now be had. In this apparatus, the main water coil 12 and the auxiliary water coil 13 are connected in series relation and receive a supply of water continuously from the feed pipe 8. The pilot light 15 is located directly beneath the auxiliary coil 13 and continuously imparts heat to the water contained therein or passing through it, while the main burner 14 is adapted to receive a supply of gas from a supply pipe 19 through a valve 20 which is actuated to its open position only when water is drawn through the coils 12 and 13. The valve 20 embodies a movable valve member 60 which is mechanically connected to a diaphragm 61 by means of a stem 62. The diaphragm 61 forms a part of a pressure device 63 which communicates with the main feed pipe 8.

Under normal conditions when no water is being drawn, the pressure within the device 63 is sufficient to force the diaphragm 61 downwardly and maintain the valve member 60 in its closed position whereby no gas is supplied to the main burner 14. However, when water is drawn through the coils 12 and 13, the pressure within the device 63 is reduced and the diaphragm 61 and valve member 60 are raised from their initial positions, whence the gas is admitted to the burner 14 and is at once ignited by the pilot light, after which the main coil 12 is heated.

From the foregoing description, it is manifest that the type of "instantaneous" heater shown in Fig. 5 is applicable to the general system of distribution hereinbefore set forth, since it serves to supply heat at all times to the water in the hot water system 4.

In Fig. 6, an ordinary form of a continuously operative heater is illustrated, which comprises a main water tank 65 and a heating device 66 by means of which heat is continuously imparted to the water contained within the tank 65. Obviously, this form of heater is also adapted to be used with the distributing system set forth.

Referring to Fig. 4, a modified form of automatic valve is shown, which comprises a main casing 68 having an enlarged central chamber 69 in which is disposed a pivotally mounted movable valve member 70. The member 70 normally is suspended vertically and, in this position, a slight flow of fluid through the chamber 69 is permitted. However, when the flow becomes excessive the pivotally mounted valve member 70 is moved in one direction or the other to cut off the flow and close the communication through the valve. This type of valve may be employed in lieu of the valves 36 and 36ᵃ.

Although I have shown and described my invention as embodying more or less specific structural details and arrangement and location of parts, it is evident that many modifications may be effected therein without departing from the spirit and scope of my invention. I desire, therefore, that only such limitations shall be imposed as are indicated in the appended claims.

I claim as my invention:

1. The combination with a plurality of water distributing systems and means associated with the respective systems for drawing off water, of normally open interconnecting means joining said systems and automatic means associated therewith for closing said interconnecting means when water is drawn from either of said systems.

2. The combination with a plurality of water distributing systems and means associated with the respective systems for drawing off water, of interconnecting means joining said systems for normally permitting a flow of water between said systems in either direction, and means associated with said interconnecting means for closing said interconnecting means under predetermined conditions of flow in either direction.

3. The combination with a plurality of water distributing systems and means associated with the respective systems for drawing off water, of interconnecting means for permitting a circulation of water between said systems, and a normally open automatic double acting valve associated with said interconnecting means for closing said means in accordance with the direction and rate of the water circulation.

4. The combination with a hot-water and a cold-water system, and valves associated with the respective systems, of means for interconnecting said systems, and means independent of said valves for closing said interconnecting means when water is drawn from any of said valves.

5. The combination with a hot-water system and a cold-water system receiving water from a common source, and a plurality of valves respectively associated with said systems, of common means for establishing a communication between said systems, and automatic means associated with said communicating means for closing said means when water is drawn through any of said valves.

6. The combination with a hot-water system and a cold-water system receiving water from a common source, and a plurality of valves respectively associated with said systems, of an interconnecting means joining said systems on the supply side of said valves, and an automatic normally open valve disposed in said interconnecting means and adapted to be closed when water is drawn through any of said first mentioned valves.

7. The combination with a hot-water system and a cold-water system receiving water from a common source, and a plurality of valves respectively associated with said systems, of interconnecting means associated with said systems for normally permitting a circulation of water through said systems, and means for preventing said circulation when water is drawn through any of said valves.

8. The combination with a hot-water system and a cold-water system receiving water from a common supply, and a plurality of valves respectively associated with ends of said systems, of means interconnecting said systems on the supply side of said valves for permitting a thermal circulation of warm water through both systems for preventing freezing, and means associated with said interconnecting means and independent of said valves for closing said interconnecting means to prevent the circulation when any of said valves is opened to draw water.

9. The combination with a hot-water and a cold-water distributing system receiving water from a common source and means for interconnecting said systems, of automatic means for isolating said systems when water is drawn from either of them.

In testimony whereof I have hereunto subscribed my name this 9th day of Dec., 1914.

LEWIS W. CHUBB.

Witnesses:
B. B. HINES,
LEILA CUNNINGHAM.

Copies of this patent may be obtained for five cents each, by addressing the "Commissioner of Patents, Washington, D. C."